United States Patent
Du et al.

(10) Patent No.: US 12,539,320 B2
(45) Date of Patent: Feb. 3, 2026

(54) COMPOSITION FOR IMPROVING EYESIGHT

(71) Applicant: South China Agricultural University, Guangdong (CN)

(72) Inventors: Bing Du, Guangdong (CN); Dong Peng, Guangdong (CN); Pan Li, Guangdong (CN); Shaojie Huang, Guangdong (CN)

(73) Assignee: South China Agricultural University, Guangzhou (CN)

( * ) Notice: Subject to any disclaimer, the term of this patent is extended or adjusted under 35 U.S.C. 154(b) by 365 days.

(21) Appl. No.: 18/134,050

(22) Filed: Apr. 13, 2023

(65) Prior Publication Data

US 2023/0330168 A1   Oct. 19, 2023

(30) Foreign Application Priority Data

Apr. 13, 2022   (CN) .......................... 202210389103.6

(51) Int. Cl.
| | |
|---|---|
| *A61K 36/47* | (2006.01) |
| *A23L 33/00* | (2016.01) |
| *A23L 33/105* | (2016.01) |
| *A23L 33/12* | (2016.01) |
| *A61K 31/232* | (2006.01) |
| *A61K 36/752* | (2006.01) |
| *A61P 27/04* | (2006.01) |

(52) U.S. Cl.
CPC ............ *A61K 36/47* (2013.01); *A23L 33/105* (2016.08); *A23L 33/12* (2016.08); *A23L 33/40* (2016.08); *A61K 31/232* (2013.01); *A61K 36/752* (2013.01); *A61P 27/04* (2018.01)

(58) Field of Classification Search
CPC ............ A23V 2002/00; A23V 2200/30; A23V 2250/21; A61K 36/752; A61K 2300/00; A61K 36/47; A61K 31/23; A61K 31/231
See application file for complete search history.

(56) References Cited

U.S. PATENT DOCUMENTS

2012/0100223 A1* 4/2012 Bhagat .................... A61P 15/08
424/771

FOREIGN PATENT DOCUMENTS

| CN | 103947770 A | | 7/2014 | |
|---|---|---|---|---|
| CN | 105918780 A | * | 9/2016 | ............... A23L 7/10 |
| GB | 2301775 A | * | 12/1996 | ........... A61K 31/375 |
| WO | 2021094918 A1 | | 5/2021 | |

OTHER PUBLICATIONS

English Google translation of CN 105918780 A—Sep. 7, 2016, 6 pages (Year: 2016).*

* cited by examiner

*Primary Examiner* — Aradhana Sasan

(57) ABSTRACT

The present disclosure discloses a composition for improving eyesight, and relates to the technical field of food. The composition comprises *Plukenetia volubilis* oil, citri reticulatae pericarpium oil, and lutein ester. The composition can be prepared into a powder, a tablet, a capsule, a granule, an oral preparation, and a dripping pill. The composition can effectively relieve asthenopia, prevent impaired vision, and improve eyesight, and has a good market prospect.

6 Claims, No Drawings

COMPOSITION FOR IMPROVING EYESIGHT

CROSS REFERENCE TO RELATED APPLICATION

This application is based upon and claims priority to Chinese Patent Application No. 202210389103.6 filed on Apr. 13, 2022 and entitled "composition for improving eyesight", the contents of which are incorporated herein by reference in their entirety.

FIELD OF TECHNOLOGY

The present disclosure relates to the technical field of food and particularly discloses a composition for improving vision.

BACKGROUND

Myopia is an eye disease that affects human health and life quality. The myopia has become a global disease.

Environmental factors play an important role in the occurrence and development of the myopia. With the popularization of electronic products, impaired vision is caused by long-term close-distance eye use. At present, most of myopes choose to wear glasses, but frequent wearing of the glasses may cause asthenopia and continuous impairment of vision. Therefore, the development of a composition effective for relieving asthenopia, preventing impaired vision, and improving vision is urgently needed.

SUMMARY

The present disclosure aims at the current situation at present about asthenopia and continuous impairment of vision. The present disclosure provides a synergistic composition for improving eyesight.

A synergistic composition for improving eyesight comprising the following components in parts by weight: 50-100 parts of *Plukenetia volubilis* Oil, 1-50 parts of Citri Reticulatae Pericarpium Oil, and 1-5 parts of Lutein Ester.

Preferably, the synergistic composition for improving eyesight comprising the following components in parts by weight: 50 parts of *Plukenetia volubilis* oil, 1 part of citri reticulatae pericarpium oil, and 1 part of lutein ester.

Preferably, the synergistic composition for improving eyesight comprising the following components in parts by weight: 100 parts of *Plukenetia volubilis* oil, 50 parts of citri reticulatae pericarpium oil, and 5 parts of lutein ester.

Preferably, the synergistic composition for improving eyesight comprising the following components in parts by weight: 75 parts of *Plukenetia volubilis* oil, 25 parts of citri reticulatae pericarpium oil, and 2.5 parts of lutein ester.

Preferably, the composition is in the form selected from the group consisting of a powder, tablet, capsule, granule, oral preparation, and dripping pill.

The beneficial effects of the present invention are:

The present disclosure provides a composition containing *Plukenetia volubilis* oil, citri reticulatae pericarpium oil, and lutein ester. Not only found that the composition may effectively relieve asthenopia, prevent impaired vision, and improve vision, and has a good market prospect, but unexpectedly a synergism between those components is showing, that the addition of the citri reticulatae pericarpium oil surprisingly enhanced the effect of a composition of the *Plukenetia volubilis* oil and the lutein ester, and improve the taste reducing the greasiness.

DESCRIPTION OF THE EMBODIMENTS

*Plukenetia volubilis* linneo, also known as sacha inchi, Inca Peanut or *Plukenetia volubilis*, belongs to Euphorbiaceae perennial woody vine. *Plukenetia volubilis* seed oil, also can be referred as sacha inchi oil, is a light yellow transparent oily liquid prepared from *Plukenetia volubilis* seeds and nuts, and is rich in various active ingredients such as unsaturated fatty acid, vitamin E, sterol, and polyphenol. The content of unsaturated fatty acid in the *Plukenetia volubilis* oil accounts for 91% or more of that of total fatty acid. The unsaturated fatty acid mainly comprises linolenic acid and linoleic acid which are both unsaturated fatty acids essential to human bodies. The *Plukenetia volubilis* oil has multiple effects on resisting oxidation, regulating blood fat, improving immunity, memory, and vision, and the like, and is approved to be a national new resource food in 2013. Researches find that the *Plukenetia volubilis* seed oil may provide nutrient components required by the optic nerve. Besides, the enriched linolenic acid plays an important role in retina.

Citri Reticulatae Pericarpium (dried tangerine peel) is a mature pericarp of a tangerine belonging to Citrus of Rutaceae and a cultivar thereof, has obvious effects on preventing atherosclerosis, enhancing immunity, lowering blood pressure, and resisting oxidation, and is a valuable medicinally and edibly homologous raw material. Citri reticulatae pericarpium oil (oil of dried tangerine peel) is a light yellow transparent oily substance extracted from citri reticulatae pericarpium, has a main component of D-limonene, and has various physiological effects on resisting inflammation, inhibiting microorganisms, resisting oxidation and aging, and the like. The study of citri reticulatae pericarpium and the citri reticulatae pericarpium oil on improving vision has not been reported.

Lutein ester is a combination form of lutein and fatty acid, may be converted into lutein in human body, and is a safe food for improving vision. Lutein, a carotenoid, cannot be synthesized by human body himself, and needs to be taken from diet. The lutein is one of major pigments constituting a macular area of a human eye and may exert a function of an antioxidant. Researches find that the lutein may relieve asthenopia, improve vision, prevent blue light from affecting cells of optic nerve, and repair damaged retinal tissues.

The following is examples of the present disclosure and the examples are used to further describe the present disclosure in detail. However, it should be noted that the examples are only used for illustrating the present disclosure, but should not be deemed as a limitation of the scope of the present disclosure. It should be pointed out that a person of ordinary skill in the art may further make several improvements and modifications without departing from the principle of the present disclosure, but such improvements and modifications should be deemed as falling within the protection scope of the present disclosure.

Example 1

A composition for improving eyesight comprises the following components in parts by weight: 50 parts of *Plukenetia volubilis* oil, 1 part of citri reticulatae pericarpium oil, and 1 part of lutein ester.

Example 2

A composition for improving eyesight comprises the following components in parts by weight: 100 parts of *Plukenetia volubilis* oil, 50 parts of citri reticulatae pericarpium oil, and 5 parts of lutein ester.

Example 3

A composition for improving eyesight comprises the following components in parts by weight: 75 parts of *Plukenetia volubilis* oil, 25 parts of citri reticulatae pericarpium oil, and 2.5 parts of lutein ester.

Comparative Example 1

A single component is *Plukenetia volubilis* oil.

Comparative Example 2

A single component is citri reticulatae pericarpium oil.

Comparative Example 3

A single component is lutein ester.

Comparative Example 4

A composition comprising the following components in parts by weight: 50 parts of *Plukenetia volubilis* oil and 1 part of lutein ester.

To further verify the technical effects of the present disclosure, the compositions for improving vision prepared in the examples and comparative examples of the present disclosure were subjected to the following tests.

1. Animal Tests on Samples of Examples 1-3 and Comparative Examples 1-4

1.1 Test animals: 100 SPF-grade 8-week-old healthy BALB/c mice, each weighed 18-22 g, were selected, and anterior segment and fundus of the eyes were not abnormal.

1.2. Establishment of animal model: 90 mice were selected to induce a model of xerophthalmia. 5 µL of 2 g/L of a benzalkonium chloride solution was dripped into conjunctival sac of the eyes of 90 mice for 2 times a day and continuously for 15 days. After the modeling was success, the mice were randomly divided into 9 groups with 10 mice in each group.

1.3. Test method: the 9 groups of the mice with xerophthalmia: Model control group: 5 µL of normal saline was dripped into the conjunctival sac of the eyes of the mice of the group for 2 times a day continuously for 15 days; Positive control group: 5 µL of artificial tears were dripped into the conjunctival sac of the eyes of the mice of the group for 2 times a day for 15 days continuously; Example 1 group: 5 µL of the composition sample of example 1 was dripped into the conjunctival sac of the eyes of the mice of the group for 2 times a day continuously for 15 days; Example 2 group: 5 µL of the composition sample of example 2 was dripped into the conjunctival sac of the eyes of the mice of the group for 2 times a day continuously for 15 days; Example 3 group: 5 µL of the composition sample of example 3 was dripped into the conjunctival sac of the eyes of the mice of the group for 2 times a day continuously for 15 days; Comparative example 1 group: 5 µL of the sample of comparative example 1 was dripped into the conjunctival sac of the eyes of the mice of the group for 2 times a day continuously for 15 days; Ccomparative example 2 group: 5 µL of the sample of comparative example 2 was dripped into the conjunctival sac of the eyes of the mice of the group for 2 times a day continuously for 15 days; Comparative example 3 group: 5 µL of the sample of comparative example 3 was dripped into the conjunctival sac of the eyes of the mice of the group for 2 times a day continuously for 15 days; Comparative example 4 group: 5 µL of the sample of comparative example 4 was dripped into the conjunctival sac of the eyes of the mice of the group for 2 times a day continuously for 15 days. Another 10 normal mice were used as a blank control group and treated as the mice in the model control group. After 15 days, the secretion amount of tear, breakup time of a tear film, and the expression amount of conjunctival epithelial mucin MUC5AC were measured for the mice in each group.

(1) Measurement of secretion amount of tear: a phenol red cotton thread was placed in the conjunctival sac of the mouse at about ⅓ outside for 1 min and a length of a red part of the phenol red cotton thread was measured.

(2) Measurement of breakup time of tear film: 1 µL of 10 g/L of a fluorescein sodium solution was dripped into the conjunctival sac of the mouse, after the mouse blinked, the eyes were artificially kept in a normal opening state, and time for a tear film to generate the 1st black spot (breaking point) was observed and recorded under a cobalt blue light of a slit lamp.

(3) Measurement of expression amount of conjunctival epithelial mucin MUC5AC: an expression level of the mucin MUC5AC in the conjunctival epithelial cells of the mouse was detected by Western Blot.

1.4. Test Results:

The test results of the effects of the test samples on the secretion amount of tear, the breakup time of a tear film, and the expression amount of the conjunctival epithelial mucin MUC5AC of the mice were shown in Table 1.

Table 1 showed the effects of the test samples on the secretion amount of tear, the breakup time of a tear film, and the expression amount of the conjunctival epithelial mucin MUC5AC of the mice.

| | Indicators | | |
| --- | --- | --- | --- |
| Groups | Secretion amount of tear (mm) | Breakup time of tear film (s) | Expression amount of conjunctival epithelial mucin MUC5AC (ng/mg) |
| Blank control group | 8.33 ± 1.69 | 64.13 ± 3.56 | 0.45 ± 0.15 |
| Model control group | 4.46 ± 1.25## | 23.43 ± 8.28## | 0.28 ± 0.08# |
| Positive control group | 7.64 ± 1.68** | 52.39 ± 7.85** | 0.31 ± 0.06 |
| Example 1 | 7.13 ± 2.83* | 50.27 ± 11.87** | 0.43 ± 0.12* |
| Example 2 | 9.26 ± 4.21**△ | 55.48 ± 14.63**△ | 0.48 ± 0.16* |
| Example 3 | 8.62 ± 3.14** | 52.51 ± 11.94** | 0.47 ± 0.15* |
| Comparative example 1 | 6.24 ± 1.52 | 38.48 ± 14.87 | 0.37 ± 0.12 |
| Comparative example 2 | 5.03 ± 1.27 | 26.45 ± 13.31 | 0.30 ± 0.04 |
| Comparative example 3 | 6.46 ± 1.67 | 36.72 ± 10.46 | 0.38 ± 0.08 |
| Comparative example 4 | 6.58 ± 1.97 | 40.47 ± 15.16 | 0.38 ± 0.10 |

Note: the results are expressed as mean±standard deviation. Compared with the blank control group, #, $P<0.05$ and \#\#, P<0.01; compared with the model control group, \*, P<0.05 and \*\*, P<0.01; and compared with comparative example 4, Δ, P<0.05.

It can be seen from Table 1, compared with the blank control group, the secretion amount of tear, the breakup time of a tear film, and the expression amount of the conjunctival epithelial mucin MUC5AC of the mice in the model control group were all significantly reduced, which indicated that the model was successful established. Compared with the model control group, after the mice with xerophthalmia were treated with the samples in the example 1-3 groups and the comparative example 1-4 groups, the secretion amount of tear, the breakup time of a tear film, and the expression amount of the conjunctival epithelial mucin MUC5AC were increased to a certain extent, and the increases of the indicators in the example 1-3 groups were statistically significant, which indicated that the composition of the present disclosure had an obvious effect on improving vision. Compared with the positive control group, the secretion amount of tear, the breakup time of a tear film, and the expression amount of the conjunctival epithelial mucin MUC5AC of the mice in the example 2-3 groups were all greater, which indicated that the composition of the present disclosure had a treatment effect stronger than that of the artificial tears. Compared with the comparative example 1 group and the comparative example 3 group, the increases of the secretion amount of tear, the breakup time of a tear film, and the expression amount of the conjunctival epithelial mucin MUC5AC of the mice in the comparative example 4 group were not obvious and had no statistical significance, which indicated that the treatment effect of a combination of the *Plukenetia volubilis* oil and the lutein ester was not obviously enhanced. Compared with the comparative example 4 group, the secretion amount of tear, the breakup time of a tear film, and the expression amount of the conjunctival epithelial mucin MUC5AC of the mice in the example 1-3 groups were increased to a certain extent, and the increases of the secretion amount of tear and the breakup time of a tear film of the mice in the example 2 group were statistically significant, which indicated that the treatment effect of a composition of the *Plukenetia volubilis* oil and the lutein ester was obviously enhanced by adding the citri reticulatae pericarpium oil. The composition of the present disclosure had a remarkable treatment effect on the mice with xerophthalmia and may effectively relieve asthenopia, prevent impaired vision, and improve vision, and unexpectedly a synergism between those components is showing, that the addition of the citri reticulatae pericarpium oil surprisingly enhanced the effect to improving eyesight of a composition of the *Plukenetia volubilis* oil and the lutein ester. Besides, when the composition was in the corresponding amount in example 2, the composition had a best treatment effect.

2. Taste Test on Samples of Example 2 and Comparative Example 4

2.1. Test method: the samples of example 2 and comparative example 4 were prepared in a form of capsule respectively. Professionals were invited to constitute an evaluation group to evaluate the taste of the product and a detailed scoring rule was shown in Table 2.

TABLE 2

Criteria of taste evaluation

| Taste features | Score |
|---|---|
| Good taste, no greasy feeling, and better explosion feeling after slight bite | 5 |
| Quite good taste, weak greasy feeling, and certain explosion feeling after slight bite | 4 |
| Moderate taste, ordinary greasy feeling, and moderate explosion feeling after slight bite | 3 |
| Bad taste, relatively strong greasy feeling, and weak explosion feeling after slight bite | 2 |
| Rough taste, strong greasy feeling, and almost no explosion feeling after slight bite | 1 |

2.2. Test Results

The results of taste evaluation of the tested product were shown in Table 3.

TABLE 3

Results of taste evaluation of tested products

| Groups | Score |
|---|---|
| Example 2 | 4.5 ± 0.5 |
| Comparative example 4 | 3.5 ± 0.7 |

Note:
the results are expressed as mean ± standard deviation.

It can be seen from Table 3, the taste score of the product in the example 2 group was better than that in the comparative example 4 group, which indicated that the taste of the composition of the *Plukenetia volubilis* oil and the lutein ester may be improved by adding the citri reticulatae pericarpium oil, such that the product was more easily accepted by consumers and had a better market prospect.

It is apparent for those skilled in the art that the present disclosure is not limited to details of the above exemplary examples, and that the present disclosure may be implemented in other specific forms without departing from the spirit or basic features of the present disclosure. The examples should be regarded as exemplary and non-limiting in every respect, and the scope of the disclosure is defined by the appended claims rather than the above description. Therefore, all changes falling within the meaning and scope of equivalent elements of the claims should be included in the present disclosure.

Besides, it should be understood that although this specification is described in accordance with the embodiments, not every embodiment includes only one independent technical solution. Such a description is merely for the sake of clarity, and those skilled in the art should take this specification as a whole. The technical solutions in the examples can also be appropriately combined to form other embodiments which are comprehensible for those skilled in the art.

The invention claimed is:

1. A composition for improving eyesight, consisting of the following components in parts by weight: 50-100 parts of *Plukenetia volubilis* oil, 1-50 parts of citri reticulatae pericarpium oil, and 1-5 parts of lutein ester.

2. The composition for improving eyesight according to claim 1, consisting of the following components in parts by weight: 50 parts of *Plukenetia volubilis* oil, 1 part of citri reticulatae pericarpium oil, and 1 part of lutein ester.

3. The composition for improving eyesight according to claim 1, consisting of the following components in parts by weight: 100 parts of *Plukenetia volubilis* oil, 50 parts of citri reticulatae pericarpium oil, and 5 parts of lutein ester.

4. The composition for improving eyesight according to claim 1, consisting of the following components in parts by weight: 75 parts of *Plukenetia volubilis* oil, 25 parts of citri reticulatae pericarpium oil, and 2.5 parts of lutein ester.

5. The composition for improving eyesight according to claim 1, wherein the composition is in the form selected from the group consisting of powder, tablet, capsule, granule, and dripping pill.

6. The composition for improving eyesight according to claim 1, wherein the composition is in the form of oral preparation.

* * * * *